United States Patent [19]

Hausy et al.

[11] Patent Number: 5,097,745
[45] Date of Patent: Mar. 24, 1992

[54] SPEED CONTROL VALVE FOR A HYDRAULIC MOTOR SPEED CONTROLLED BY PRESSURE BETWEEN THROTTLE AND MOTOR

[75] Inventors: Werner Hausy, Scheidegg; Thomas Rieger, Lindenberg; Theodor Anneser, Scheidegg, all of Fed. Rep. of Germany

[73] Assignee: Liebherr-Aero-Technik GmbH, Fed. Rep. of Germany

[21] Appl. No.: 540,201

[22] Filed: Jun. 19, 1990

[30] Foreign Application Priority Data

Jun. 20, 1989 [DE] Fed. Rep. of Germany ....... 3920131

[51] Int. Cl.⁵ .............................................. F15B 13/44
[52] U.S. Cl. ....................................... 91/459; 60/460; 60/493
[58] Field of Search .................. 92/62, 75, 13.1; 91/459, 167, 433, 361, 461; 60/460, 493

[56] References Cited

U.S. PATENT DOCUMENTS

| | | | |
|---|---|---|---|
| 2,157,240 | 5/1939 | Keel | 91/167 |
| 3,213,886 | 10/1965 | Pearne | 92/13.1 |
| 3,623,507 | 11/1971 | Friedberg | 91/167 |
| 3,818,802 | 6/1974 | Wilson | 91/443 |
| 3,949,645 | 4/1976 | Masclet | 91/459 |
| 4,041,983 | 8/1977 | Bianchetta | 91/433 |
| 4,072,087 | 2/1978 | Mueller | 91/459 |
| 4,559,895 | 12/1985 | Kijima et al. | 92/62 |

Primary Examiner—Edward K. Look
Assistant Examiner—F. Daniel Lopez
Attorney, Agent, or Firm—Bacon & Thomas

[57] ABSTRACT

A control block, having few moving parts and few bores, for the hydraulic drive of an airplane control surface comprises a primary spool valve 2 which is shifted by two electromagnetic valves I, II to determine the direction of rotation of a hydraulic motor 18. A prolongation 20 of primary spool valve 2 is located in a pressure chamber D and bears two annular pistons 22, 24 which are always a minimum distance apart. Space 26 is adapted to be connected via a control valve 34 with the return line of the hydraulic system. The position of slide 36 of control valve 34 is influenced by an electromagnetic valve III to change the pressure of the fluid in space 26 and thereby move the primary spool valve either into a position in which the fluid lines are completely opened (for the "fast speed" mode), or to move it into a position in which the fluid lines are throttled (for the "creep speed" mode). When there is a pressure drop, control valve 34 also reacts by moving the primary spool valve into a throttling position, so that the pressure is increased at a given hydraulic output and throttled flow rate. If the flow rate is too high, e.g. when the slats or landing flaps are retracting— the aerodynamic forces have a supporting effect here—, a throttling and thus a restriction of the flow rate and the speed is obtained.

3 Claims, 1 Drawing Sheet

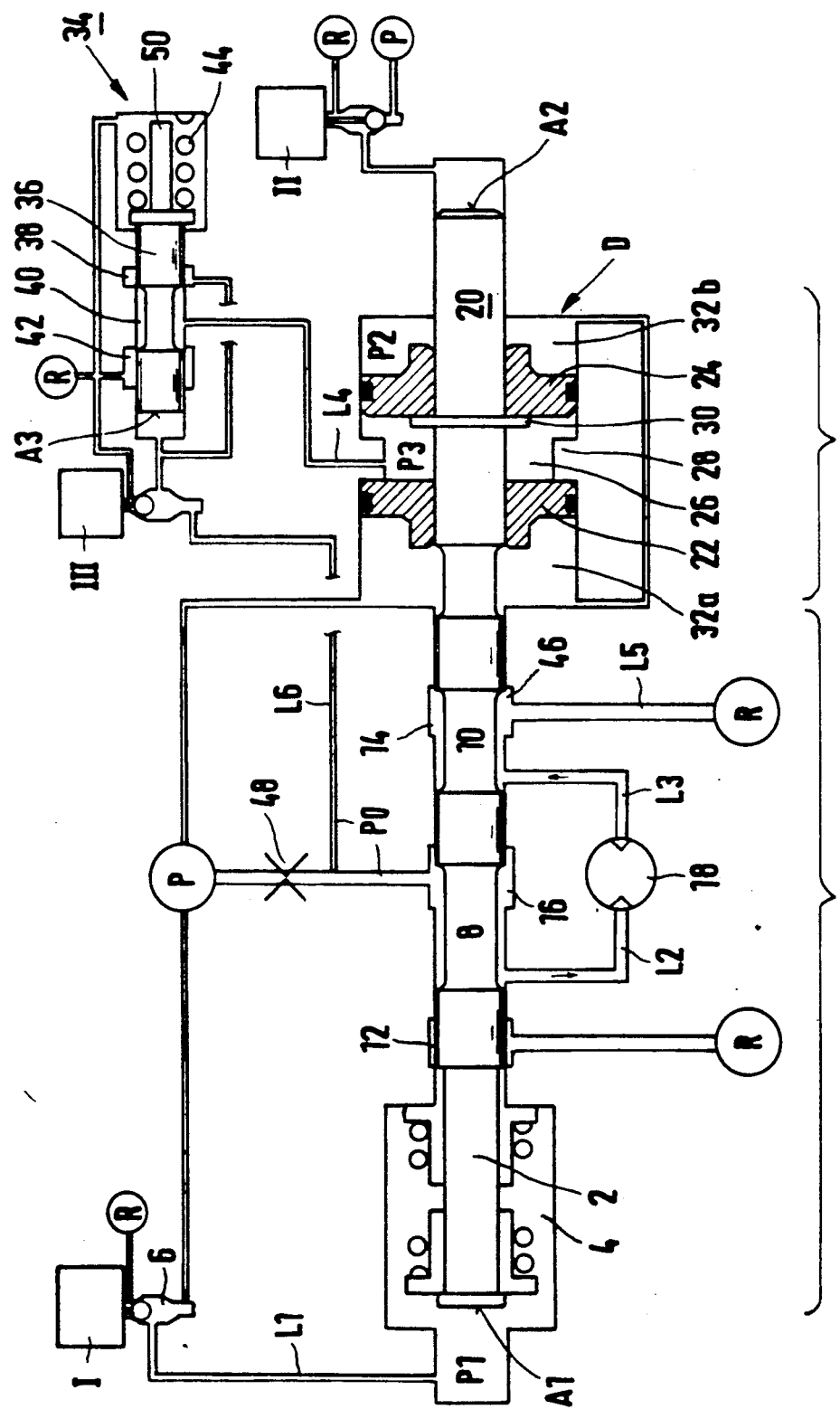

SPEED CONTROL VALVE FOR A HYDRAULIC MOTOR SPEED CONTROLLED BY PRESSURE BETWEEN THROTTLE AND MOTOR

BACKGROUND OF THE INVENTION

The present invention relates to a control block for a hydraulic drive in an airplane as in the preamble of claim 1.

Such hydraulic drives are specifically used to move out and move in the slats and the landing flaps. At a central place, e.g. in the fuselage, there is a drive unit for each, basically comprising a hydraulic motor with a corresponding hydraulic drive and a subsequently arranged gearing, and moving the slats and the landing flaps via intermediate mechanical members, for example threaded spindles.

The slats, for example, are normally to be moved within a predefined speed range. The pump or motor works at high output. This operating mode shall be referred to here as "fast speed".

Since the slats and landing flaps to be moved are relatively large masses but must be placed exactly in certain positions, a "creep speed" mode is provided in which the parts to be moved are brought closer to their desired end positions at relatively slow speed after having been moved at fast speed.

SUMMARY OF THE INVENTION

To control the hydraulic drive, there is firstly the primary spool valve which, in the way known as such, determines the direction of flow of the fluid in the control lines connected to the hydraulic motor, so that the motor rotates in one or the other direction depending on whether the part to be driven is to be moved in one or the other direction.

For selecting either the "fast speed" or the "creep speed" mode one can provide a separate valve which is formed in the same control block as the primary spool valve. The valve provided for selecting the mode includes a spool valve which, in connection with at least one annular space surrounding the spool valve and a constriction at the valve, either completely unblocks the fluid line or constricts it in throttling fashion. When the fluid line is throttled, this reduces the rate of flow of the fluid so that the part to be driven is moved relatively slowly.

Apart from these two valves, there must also be a flow restrictor which is customarily a spring-loaded piston adapted to be displaced within a cylindrical space and having an orifice gauge. The reason for the flow restrictor is as follows. When the slats are moved in, for example, the aerodynamic loads have a partly supporting effect or are at least so small that the load moment of the motor approaches zero, i.e. the motor rotates too fast and therefore:

a) the valves move too fast and/or
b) too much flow is demanded of the airplane pump, which has an adverse effect on other functionally important systems supplied by this pump, e.g. primary control surface drives.

One could consider disposing the aforesaid primary spool valve, the mode setting slide and the flow restrictor in one control block. However, the various lines necessitate a great number of bores in the block, which must all have a sufficiently large cross section, so that a relatively large number of blind plugs is required for sealing through bores. Such blind plugs constitute a considerable weak point in the overall hydraulic system, however, so that their number should be limited to a minimum.

In addition to the "normal operation" functions explained above, the control means for the hydraulic drive has other tasks. If the normal drive of the hydraulic pump fails, as happens for example if the power unit is defective, the hydraulic pump must be able to be driven in another way, e.g. by an electromotor, whether supplied by the mains or by battery. For such emergency operation one can usually provide only limited output which is lower than the normal nominal output. The hydraulic output N is generally calculated according to the formula $$N = P \times Q (W)$$

where N is the hydraulic output, P the system pressure, and Q the rate of flow, and the unit of output is for example watts (W).

At a given relatively low hydraulic output during emergency operation one could now consider reducing either the rate of flow or the system pressure, or both. While the customary system pressure is about 200 bar, however, a pressure of 120 bar must not be fallen short of, so that it is necessary to control down the flow by suitable measures so far that the pressure remains at a value above 120 bar (function: maintain pressure). At a given hydraulic output one then calculates the maximum available rate of flow. In the extreme case the hydraulic drive thus works in an operating state corresponding to "creep speed".

The invention is based on the problem of providing a control block of the type stated at the outset which contains virtually all means for the required functions, but only a minimal number of lines, in particular blind plugs.

The special feature of the inventive control block is that it contains virtually only one valve in addition to the primary spool valve, but nevertheless ensures all the functions explained above.

The primary spool valve bears on a prolongation an extension of an annular piston in a pressure chamber. In connection with the electromagnetic valve this permits reliable selection of the "fast speed" or "creep speed" mode.

In connection with the sharp-edged orifice in a fluid line on the pressure side, the additional part of the primary spool valve is made to work in such a way that it also performs a function of the flow restrictor. The additional valve is a creep control valve having a slide that is loaded by a spring on one side, while the other face is pressurized by the system pressure or the throttled system pressure. An annular recess or constriction of the slide borders on spaced apart annular spaces surrounding the slide for the pressure side of the fluid or the return. At correct system pressure the slide assumes a central balanced position, so that the constriction forms at its end areas a pressure edge or a return edge with the corresponding annular spaces. In the case of a pressure drop in the system, the spring force becomes dominant and opens via a fluid line the space on the other side of the annular piston in the pressure chamber toward the return, so that the primary spool valve is moved into a position in which the fluid line of the system is throttled at a suitable place on the primary spool valve. This throttling of the flow increases the system pressure at a given hydraulic output in accordance with the above equation. When this pressure has increased to a sufficient extent the control valve resumes its neutral position. In this way the control valve effects the necessary maintenance of pressure.

DESCRIPTION OF THE DRAWING

In the following an exemplary embodiment of the invention shall be explained with reference to the single FIGURE. The FIGURE shows a highly schematized view of a control block for the hydraulic drive of a slat in an airplane.

DETAILED DESCRIPTION OF THE PREFERRED EMBODIMENT

The arrangement shown in the FIGURE is formed in a single metal block, whereby only the electromagnetic valves and end areas of the primary control valve yet to be described protrude partly from the block.

The left end of a primary spool valve 2 is located in a cylindrical chamber 4, wherein a spring seated on the end of primary spool valve 2 biases the primary spool valve to the left. Face A1 of primary spool valve 2 is a reversing servo piston and is subject to pressure P1 of a hydraulic fluid. Cylindrical chamber 4 communicates via a fluid line L1 with a valve 6 which is formed with an electromagnet as electromagnetic valve I. Valve 6 is formed here as a ball valve which connects fluid line L1—as shown—with pressure side P of the hydraulic system when the electromagnet is excited. In the other valve position, line L1 is connected with return line R.

A second electromagnetic valve II is currentless in the state shown, so that right face A2 of primary spool valve 2, which is a second reversing servo piston, is not pressurized since the adjacent space is connected with return line R. Accordingly, the entire primary spool valve 2 is urged to the right as shown in the FIGURE.

The primary spool valve possesses at its right end a prolongation or extension 20 formed integrally therewith, whereby the left part of primary spool valve 2 is provided for the basic function while prolongation 20 is provided with a pressure chamber D for mode selection or an additional function, as will be described below in more detail.

In the left area, primary spool valve 2 possesses two annular recesses or constrictions 8 and 10. In the vicinity of the external ends of constrictions 8 and 10 the primary spool valve is surrounded by two annular fluid return spaces or ports 12 and 14 which are connected to return line R. In the middle between these annular spaces 12 and 14 there is a further inlet annular space or port 16 which is connected to throttled pressure inlet line P0 and via a sharp-edged orifice 48 to pressure line P. Two supply/return fluid lines L2 and L3, which are connected as control lines with a hydraulic motor 18, open into the two areas between annular spaces 12, 16 and 16, 14. The hydraulic motor is, for example, a swash plate axial piston motor. In the position of primary spool valve 2 shown, fluid flows from system pressure line P in the direction of the arrow through line L2 to hydraulic motor 18, while the fluid reaches return line R through fluid line L3, constriction 10, annular space 14 and a fluid line L5. This flowing fluid adjusts the hydraulic motor so that it rotates to the right, for example, to move out the slat coupled indirectly with the motor.

To move the slat in the direction of rotation of hydraulic motor 18 is reversed, i.e. the fluid must flow in the opposite direction. For this purpose primary spool valve 2 is shifted to the left by electromagnetic valve I being switched off and electromagnetic valve II switched on. The pressure then prevailing on servo piston A2, together with the lack of counterpressure on face A1, cause primary spool valve 2 to move to the left. In this position of primary spool valve 2 not shown in the FIGURE, a connection exists between pressure side P and fluid line L3 on hydraulic motor 18, namely via annular space 16 and constriction 10, while the part of return line R shown on the left at the bottom of the FIGURE is connected via constriction 8 and annular space 12 with fluid line L2 connected to hydraulic motor 18 on the left.

This directional control of hydraulic motor 18 corresponds to the basic function of the primary spool valve. Prolongation or extension 20 of primary spool valve 2 shown on the right of the FIGURE bears two annular servo pistons 22 and 24 slidably mounted on prolongation 120 and which form between each other a space 26 whose width is determined by a stop 28 in the housing in pressure chamber D surrounding prolongation 20. Left annular piston 22 always remains against aforesaid stop 28 in the housing when primary spool valve 2 is deflected to the right. Right annular piston 24 comes to lie with its side shown on the left in the FIGURE against a collar 30 on prolongation 20 of the primary spool valve, so that annular piston 24 is carried along to the right by collar 30 when primary spool valve 2 moves to the right.

Stop 28 in annular space D also forms a flow connection between the two lateral pressure spaces 32a and 32b which are connected to system pressure line P. In space 26 a system pressure P3 prevails which is reduced by sharp-edged orifice 48 and is smaller than pressure P2 prevailing in the two external pressure spaces 32a and 32b (P2=P).

Via a fluid line L4, space 26 is connected with a creep control valve 34 serving to maintain pressure. Control valve 34 possesses a creep slide spool 36 with an annular recess or a constriction 40 having adjacent its external edges an annular pressure space 38 and an annular return space 42. In the position of slide 36 shown, a pressure edge or a return edge is formed at the external edges of constriction 40. In the position shown, control valve 34 is in balance since it is subjected on its right face to a compression spring 44 while its left face A3 is subjected to system pressure P0 via an electromagnetic valve III and a fluid line L6 downstream of sharp-edged orifice 48. In the state shown, electromagnetic valve III connects pressure P0 with annular space 38 and the chamber on face A3 of slide 36 which constitutes a creep control valve servo piston.

The basic function of the control means was already explained above. The selection of the "fast speed" or "creep speed" mode is effected with the aid of electromagnetic valve III. When this electromagnetic valve is excited—as shown—the "fast speed" mode is selected, i.e. the primary spool valve opens all line connections completely. If the slat moved in the "fast speed" mode is to be stopped at a certain place, one first switches to "creep speed" by deenergizing electromagnetic valve III. This relieves left or servo face A3 of slide 36 of control valve 34, so that slide 36 is moved to the left by the force of spring 44, maximally as far as a point where stop means 50 ends this movement. Fluid line L4 connecting space 26 in pressure chamber D via constriction 40 with annular space 42 located on return line R, is now opened so that pressure P3 in space 26 drops. The relatively high pressure P2 now urges annular piston 24 to the left, whereby it urges collar 30 and thus prolongation 20 with primary spool valve 2 to the left. At the right edge of constriction 10 on annular space 14 there is a restriction referred to as 46. Here, the cross section of the return port 2 fluid line L5 is constricted. The resulting reduction in the rate of flow of the return hydraulic fluid produces the "creep speed" mode.

When electromagnetic valve III is excited again, system pressure again reaches left face A3 of slide 36 of control valve 34, so that pressure builds up again in space 26 of pressure chamber D, this pressure being high enough to move primary spool valve 2 with its prolongation 20 to the right again and thus completely opening the return port 2 fluid line L5.

When system pressure P drops significantly, for example because the other consuming devices of the hydraulic system in the airplane demand too much output from the hydraulic pump, slide 36 of control valve 34 likewise moves to the left so that, as above, primary spool valve 2 moves to the left and the return to fluid line L5 is throttled at restriction 46. At a given hydraulic output this flow restriction results in an increase in the system pressure. When the system pressure has recovered, slide 36 of control valve 34 moves to the right again. Primary spool valve 2 thus automatically assumes a position in which the system pressure is kept above a certain, just permissible lower value.

The flow restriction function:

When the slats are moved in, for example, the aerodynamic loads have a partly supporting effect or are at least so small that the load moment of the motor approaches zero, i.e. the motor rotates too fast and therefore:

a) the valves move too fast and/or
b) too much flow is demanded of the airplane pump, which has an adverse effect on other functionally important systems supplied by this pump, e.g. primary control surface drives.

The control means shown in the FIGURE also serves to produce such a flow restriction, as is explained in the following.

When the flow increases, pressure difference $P-P0$ rises accordingly at sharp-edged orifice 48, i.e. when the flow increases pressure P0 drops relative to system pressure P. This pressure P0 which is now lower causes slide 36 of control valve 34 to move to the left and fluid line L4 to be connected with return R, so that pressure $P_3$ in pressure space 26 drops relative to pressure $P_2$ in pressure space 32b. Due to this pressure difference $P_3-P_2$ which is now greater, annular piston 24 moves to the left so that, as already explained, a constriction of fluid line L5 takes place at 46. This constriction causes throttling. Throttling also takes place in the area of annular space 16.

We claim:

1. A control valve system for controlling flow of pressurized hydraulic fluid to a reversible fluid motor useful for actuating an aircraft control surface comprising:

a system pressure supply including a system pressure supply line having a flow restrictor therein for creating a pressure drop in the line above a predetermined rate of fluid flow in the line;

a primary spool valve including a throttled fluid pressure inlet port in communication with said system pressure supply downstream of said flow restrictor, fluid supply/exhaust ports for a reversible motor, and a pair of fluid return ports, said primary valve spool including means for controlling the direction and rate of fluid pressure flow between said throttled fluid pressure inlet port and said motor fluid supply/exhaust ports, and for controlling the rate of fluid flow through said fluid return ports;

means for moving said primary spool valve axially between neutral, fast speed forward and reverse positions and creep speed forward and reverse positions, so that, in the full neutral position of the primary spool valve fluid pressure at the throttled pressure inlet is blocked; and at the fast speed forward and reverse positions of said spool valve fluid pressure is directed from said throttled fluid pressure inlet port to one or the other of the fluid supply/exhaust ports and from the other or the one fluid supply/exhaust port, respectively to a fluid return port without restriction at said fluid return port; and at a creep speed position of said spool valve fluid pressure flow is restricted at the respective fluid return port returning exhaust fluid from said motor;

said means for moving said primary spool valve including a spring biasing means for urging the primary spool valve towards a first direction, a pair of reversing servo pistons integrally formed at opposed ends of the primary spool valve, a fluid pressure supply and reversing valve system, and controllers for actuating the supply and reversing valve system including means to selectively admit pressurized fluid to either of the reversing servo pistons to drive the primary spool valve axially in cooperation with the spring biasing means towards fast speed forward or reverse positions;

said primary valve spool including an axial extension including a radial abutment;

a mode control servo piston means slidably mounted on said axial extension for driving said primary servo valve via said abutment towards a creep speed position when the primary valve spool is in its forward or reverse positions;

means for supplying unrestricted system pressure to one side of the mode control servo piston means to cause it to drive the primary spool valve towards a creep speed position while in a forward or reverse position via the radial abutment;

a throttled fluid pressure line for supplying throttled fluid pressure downstream of said flow restrictor to the opposite face of said mode control servo piston means;

a creep control valve means for selectively controlling flow of throttled fluid pressure to said throttled fluid line, said creep control valve admitting throttled fluid pressure downstream of said restrictor to said throttled fluid line when actuated towards a first (creep speed) position, and communicating said throttled fluid line to return when actuated towards a second (fast speed) position, whereby said primary spool valve while in a forward or reverse position is driven to a fast speed or intermediate creep position as determined by the net pressure differential across said mode control servo piston means and across said reversing servo pistons; and means for actuating said creep control valve means between its first and second positions in response to both an electrical control signal and in response to throttled pressure.

2. A control valve system as claimed in claim 1, wherein said mode control servo piston means comprises a pair of mode control servo pistons slidable within a respective cylinder, and axially spaced along said extension of said primary spool valve on opposite sides of said radial abutment;
   said cylinders including means for maintaining said mode control servo pistons spaced a minimum axial distance apart but reciprocable away from each other in said cylinders;
   said throttled pressure line communicating with the space between said mode control servo pistons; and
   said means for supplying unrestricted system pressure to one side of the mode control servo piston means comprises a system fluid pressure supply line and system pressure chambers in communication with said system fluid pressure supply line, said system pressure chambers disposed on the sides of said mode control servo pistons opposite said space between the servo pistons, whereby the servo pistons are subjected to unrestricted system pressure on the sides thereof opposite the abutment and to the pressure in said fluid supply line on their opposite sides adjacent the abutment.

3. A control valve system as claimed in either claim 1 or 2, wherein said means for actuating said creep control valve means comprises a creep slide spool, a creep control valve servo piston connected to one end of the creep slide spool, a spring biasing means normally urging the creep slide spool towards a first (creep) position towards said creep control valve servo piston; an electrical control means for selectively directing throttled fluid pressure downstream of said restrictor against said creep control servo piston against the bias of said spring biasing means to move the creep slide spool to a second (fast) position, or for communicating fluid pressure acting on said creep control servo piston to return; whereby said creep control piston is driven towards its fast or creep positions by the balance of the forces resulting from the spring biasing means and fluid pressure directed against said creep control valve servo piston.

* * * * *